US012626031B2

(12) United States Patent
Yamada et al.

(10) Patent No.: US 12,626,031 B2
(45) Date of Patent: May 12, 2026

(54) CLUSTERING METHOD

(71) Applicant: JGC CORPORATION, Kanagawa (JP)

(72) Inventors: Yoshinori Yamada, Kanagawa (JP);
Kaoru Sawayanagi, Kanagawa (JP)

(73) Assignee: JGC CORPORATION, Kanagawa (JP)

( * ) Notice: Subject to any disclaimer, the term of this
patent is extended or adjusted under 35
U.S.C. 154(b) by 938 days.

(21) Appl. No.: 17/800,892

(22) PCT Filed: May 18, 2020

(86) PCT No.: PCT/JP2020/019684
§ 371 (c)(1),
(2) Date: Aug. 18, 2022

(87) PCT Pub. No.: WO2021/234791
PCT Pub. Date: Nov. 25, 2021

(65) Prior Publication Data
US 2023/0084606 A1     Mar. 16, 2023

(51) Int. Cl.
*G06F 30/18* (2020.01)
*G06F 30/28* (2020.01)
*G06F 113/14* (2020.01)

(52) U.S. Cl.
CPC .............. *G06F 30/18* (2020.01); *G06F 30/28*
(2020.01); *G06F 2113/14* (2020.01)

(58) Field of Classification Search
CPC ...... G06F 30/18; G06F 30/28; G06F 2113/14;
G06F 30/13; G06F 2113/08; G06F 30/25;
G06F 30/27; G06F 2111/00–2119/22;
G06F 30/00; G06F 30/17; G06F 30/20;
G06F 30/23; G06F 30/30; G06F 30/327;
(Continued)

(56) References Cited

U.S. PATENT DOCUMENTS 8,626,835 B1     1/2014  Gyongyi et al.
2018/0365353 A1*  12/2018  Devereux ............... G06F 30/20

FOREIGN PATENT DOCUMENTS

CN        104573333       4/2015
JP        H07225788       8/1995
(Continued)

OTHER PUBLICATIONS

Di Nardo et al. "Weighted spectral clustering for water distribution
network partitioning" Applied Network Science (Year: 2017).*
(Continued)

*Primary Examiner* — Rehana Perveen
*Assistant Examiner* — Troy A Maust
(74) *Attorney, Agent, or Firm* — JCIPRNET

(57)     ABSTRACT
A clustering method includes the steps of: creating a plant
model in which connection relationships between a plurality
of devices (31) forming a processing plant (1) and pipes (4)
are represented by a graph showing a linking relationship
between a node (51) and an edge (52); setting, regarding the
plant model, a cluster division condition; and performing, by
a computer, the cluster division of the plant model by
searching for an edge between the clusters in which modu-
larity is further increased while the cluster division condition
is satisfied.

7 Claims, 11 Drawing Sheets

(58) Field of Classification Search
CPC ...... G06F 30/33; G06F 30/3312; G06F 30/34;
G06F 30/36; G06F 30/39; G06F 30/392;
G06F 30/394
See application file for complete search history.

(56) References Cited

FOREIGN PATENT DOCUMENTS

| | | | |
|---|---|---|---|
| JP | 2002351935 | | 12/2002 |
| JP | 2002351935 A | * | 12/2002 |
| JP | 2008015697 | | 1/2008 |
| WO | 2018220703 | | 12/2018 |

OTHER PUBLICATIONS

"Office Action of China Counterpart Application", issued on Oct. 23, 2024, with English translation thereof, p. 1-p. 13.
"International Search Report (Form PCT/ISA/210) of PCT/JP2020/019684," mailed on Aug. 18, 2020, with English translation thereof, pp. 1-4.

* cited by examiner

REMOVAL OF MERCURY + AGRU

AGRU

DEHYDRATION

PRECOOLING

MR SYSTEM

N₂ SYSTEM

C3 SYSTEM

OTHERS (END FLASH)

CLUSTERING METHOD

CROSS-REFERENCE TO RELATED APPLICATION

This application is a 371 application of the International PCT application serial no. PCT/JP2020/019684, filed on May 18, 2020. The entirety of the above-mentioned patent application is hereby incorporated by reference herein and made a part of this specification.

TECHNICAL FIELD

The present invention relates to a technology of grouping devices for constructing a processing plant for a fluid.

BACKGROUND ART

Processing plants configured to process a fluid include, for example, natural gas plants configured to liquefy natural gas or separate and recover natural gas liquid, petroleum refining plants configured to distill or desulfurize crude oil or various intermediates, and chemical plants configured to produce petrochemical products, intermediate chemicals, or polymers. In this application, the "fluid" includes, in addition to gas and liquid, granular materials (powder, grains, pellets, and the like) having flowability.

Those processing plants each have a configuration in which a large number of devices are arranged in a predetermined plot and those devices are connected to each other by pipes. Examples of the large number of devices include static devices such as columns, tanks, and heat exchangers, and dynamic devices such as pumps and compressors.

At this time, the arrangement of the large number of devices included in the processing plant is determined with comprehensive consideration of, for example, restrictions on a landform and area of the plot, restrictions in terms of safety, and use amounts of materials for forming the devices and pipes (economic efficiency).

In this case, in arrangement of the devices for constructing the processing plant, when a large number of devices are disorderly arranged, the pipes connecting the devices to each other become long, and the total use amount of pipe materials is increased. For this reason, a large number of devices may be divided into a plurality of groups, and arrangement positions may be determined so that the devices included in the same group are arranged in a collective region.

As grouping of the devices, in many cases, there has hitherto been adopted, for example, a method for sorting out a series of processing to be performed in the processing plant into a plurality of sections from the viewpoint of process design and including the devices to be used in each sorted processing in one group (for example, module division corresponding to each processing block of Patent Literature 1). Meanwhile, when focus is given on the connection relationships between the devices and the pipes while the content of processing of a fluid is disregarded, whether or not the grouping by the related-art method reflects the degree of relationships between the devices is not necessarily clear.

Accordingly, there is a demand for a grouping method capable of quantitatively grasping the results of determined grouping of devices with reference to the connection relationships between the devices and the pipes.

CITATION LIST

Patent Literature

Patent Literature 1: WO 2018/220703 A1

SUMMARY OF INVENTION

Technical Problem

The present technology provides a technology of grouping devices for constructing a processing plant for a fluid while enabling quantitative evaluation of the results of grouping.

Solution to Problem

The present method includes the steps of: creating a plant model in which connection relationships between a plurality of devices for constructing a processing plant configured to process a fluid and pipes connecting the devices to each other are represented by a graph showing a linking relationship between a node corresponding to each of the devices and an edge corresponding to each of the pipes; setting, regarding the plant model, a cluster division condition which is at least one of the number of clusters into which cluster division is to be performed and a range of a grain size that is an addition value of a weight set to each of the nodes included in each of the clusters; and performing, by a computer, the cluster division of the plant model by searching for an edge between the clusters in which modularity is further increased while the cluster division condition is satisfied.

The clustering method may include the following features.

(a) The step of creating the plant model includes creating the plant model in which, when cost per unit length of the corresponding pipe is higher, the edge is weighted with a larger weight.

(b) The step of creating the plant model includes creating the plant model in which, when an area of occupation of the corresponding device is larger or when evaluation values set in advance to the device are higher, the node is weighted with a larger weight.

(c) The step of performing the cluster division is performed based on a Girvan-Newman algorithm.

(d) In Item (c), the step of creating the plant model includes creating the plant model in which, when cost per unit length of the pipe is higher, the number of unweighted edges that link two nodes corresponding to two devices, to which the pipe is connected, to each other is increased.

(e) In Item (c), the nodes corresponding to the devices included in the plant model are unweighted nodes, and the step of creating the plant model includes creating the plant model in which, when the area of occupation of the device is larger or when evaluation values set in advance to the device are higher, the number of connections of dummy nodes is increased, the dummy nodes each being a node which is linked to one node corresponding to the device via one edge and which is prevented from being linked to the nodes other than the one node.

(f) The step of performing the cluster division includes the step of assigning a count value to each of edges in a shortest path between two nodes included in the plant model by counting the edges, and, when the processing plant includes a pipe branched at a branch point, the step of creating the plant model includes creating a plant model in which a branch node prevented from being selected as the two nodes when the step of assigning the count value is performed is provided so as to correspond to the branch point, and the branch node and a node corresponding to the device connected via the branched pipe are linked to each other via an edge to represent the branched pipe.

Effects of Invention

According to the present method, the plant model in which the devices and the pipes of the processing plant are represented by the graph formed of the nodes and the edges is created, and the cluster division of the plant model is searched for so that the modularity is increased under the condition set in advance. As a result, quantitative evaluation based on the evaluation criteria (modularity) can be performed, and the grouping of the devices for constructing the processing plant can be rationally performed.

DESCRIPTION OF EMBODIMENTS

Figure 1:
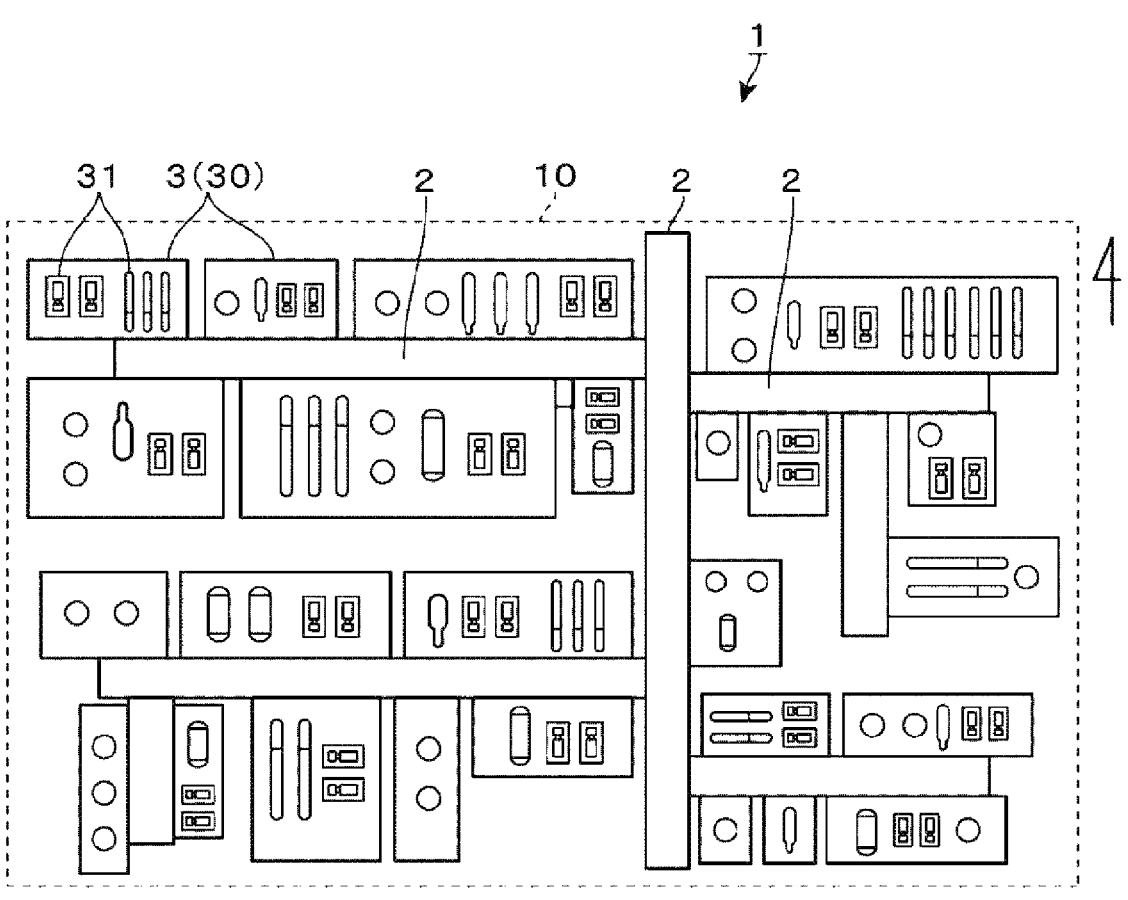
FIG. 1 is a schematic view of device arrangement of a processing plant.

FIG. 1 is a plan view for schematically illustrating a configuration of a processing plant 1 corresponding to a plant model to which a clustering method of this example is applied.

As the processing plant 1 to which this technology is applicable, there can be exemplified, for example, the natural gas plants, the petroleum refining plants, and the chemical plants described above. Those processing plants 1 each include a large number of devices 31 which process a fluid such as gas, liquid, or granular materials having flowability. As examples of the devices 31 to be provided in the processing plant 1, there can be exemplified static devices such as various processing columns, such as a fractionator column and a reaction column, and receiver tanks and heat exchangers in which gas-liquid separation is performed. There can also be exemplified dynamic devices such as pumps and compressors. The devices 31 provided in the processing plant 1 are connected to each other via pipes 4 through which the fluid is allowed to flow. In FIG. 1, illustration of pipes 4 is omitted.

When the processing plant 1 is constructed in a plot 10 set in advance, and the large number of devices 31 are arranged in a disordered state, the pipes 4 for connecting the devices 31 to each other are increased in length, and a total use amount and a cost of a pipe material are increased. Further, also from the viewpoints of maintenance management and safety management, the devices 31 are desired to be arranged in order based on the way of thinking set in advance.

Consequently, in the processing plant 1 in which the large number of devices 31 are provided, the devices are divided into groups (hereinafter referred to as "device groups 3") in accordance with the order to process the fluid or relevance between the devices 31, and the devices 31 included in a common device group 3 may be collectively arranged in a common partition region 30. In FIG. 1, the device groups 3 configured as described above are illustrated.

In this example, the device group 3 includes at least one device 31.

When the device group 3 includes a plurality of devices 31, the pipes 4 for connecting the devices 31 included in the common device group 3 to each other are arranged in the common partition region 30 in which the device group 3 is arranged.

Meanwhile, the pipes 4 for connecting the devices 31 included in different device groups 3 to each other are arranged so as to pass through, for example, a pipe rack 2. The pipe rack 2 is a framework structure that supports the pipes 4. It is not always required that the pipes 4 connecting the devices 31 included in the different device groups 3 to each other pass through the pipe rack 2. For example, the devices 31 included in the device groups 3 arranged so that the partition regions 30 are adjacent to each other may be connected to each other via the pipes 4 that do not pass through the pipe rack 2.

As illustrated in FIG. 1, the large number of devices 31 provided in the processing plant 1 are divided into a plurality of device groups 3, and the devices 31 included in each device group 3 are arranged in the common partition area 30. In this manner, for example, devices 31 that are relevant to each other can be arranged at positions close to each other. As a result, as compared to a case in which the large number of devices 31 are arranged in a disordered state, excessive increase in length of the pipes 4 for connecting the devices 31 to each other can be suppressed, and the total use amount of the pipe material can be suppressed.

Meanwhile, as described above, in the processing plant 1 including the large number of device groups 3, it is not necessarily clear what kind of grouping is preferred in arrangement of the device groups 3 in the plot 10.

In view of the foregoing, in this example, a plant model corresponding to the above-mentioned processing plant 1 is created, and calculation for performing cluster division (clustering) on the plant model into a plurality of clusters is performed by a computer. In this example, the clustering of the plant model is processing corresponding to the grouping of the devices 31 included in the processing plant 1.

In creation of the plant model of the processing plant 1, data of a process flow diagram (PFD) created when the processing plant 1 is designed can be utilized. In the PFD, there are shown the connection relationships between the devices 31 via the pipes 4 forming the processing plant 1.

Figure 2:
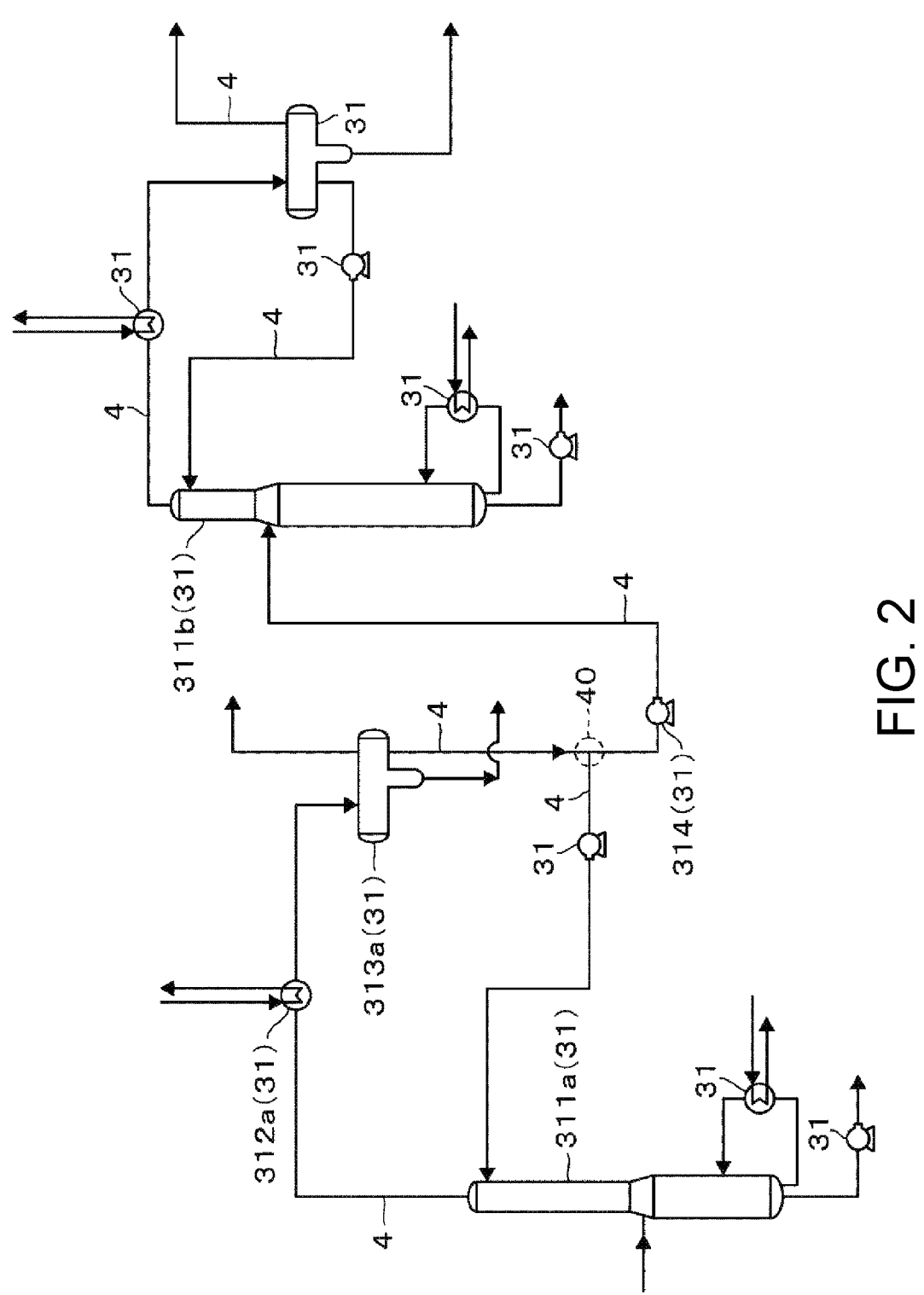
FIG. 2 shows a configuration example of a process including devices provided in the processing plant.

For example, FIG. 2 is an illustration of a part of a process flow of the processing plant 1, which represents the PFD in a simplified manner. In FIG. 2, there is illustrated a process of cooling and liquifying, by an overhead cooler 312a, gas flowing out from a column top of a fractionator column 311a on a front-stage side, and feeding, by a liquid feed pump 314, a part of liquid stored in a receiver 313a to a fractionator column 311b on a rear-stage side.

The clustering method of this example includes creating a plant model in which the connection relationships between the plurality of devices 31 forming the processing plant 1 and the pipes 4 connecting the devices 31 to each other are represented by a graph showing the linking relationships between nodes 51 and edges 52.

Figure 3:
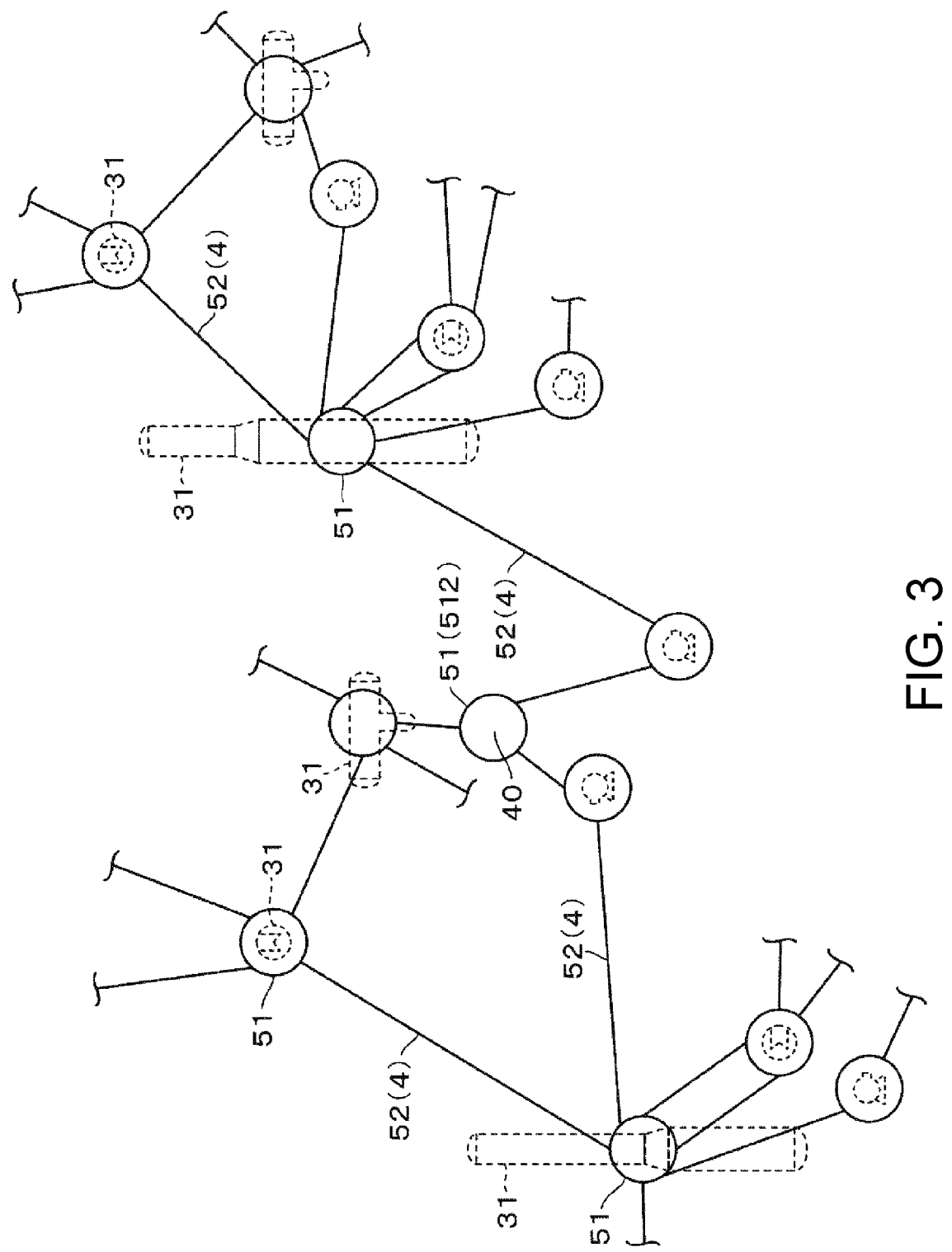
FIG. 3 shows a process model corresponding to the above-mentioned process.

As illustrated in FIG. 3, in the plant model, the devices 31 forming the processing plant 1 are associated with the nodes 51 that are distinguishable from one another, and the pipes 4 connecting the devices 31 to each other are associated with the edges 52 linked to the nodes 51. In addition, as described later, a branch point 40 of the pipe 4 may be represented by the node 51 (branch node 512).

When the PFD is data that can be processed by a computer, the plant model can be created by reading the connection relationships between the devices 31 and the pipes 4 included in the PFD data. The plant model is processed by the computer as data of an adjacency matrix or an adjacency list representing the linking relationships of the nodes 51 via the edges 52.

The creation of the plant model is not limited to a method that is automatically performed by the computer through use of the PFD. For example, data representing the plant model may be manually input to the computer that performs the clustering.

The plant model in which the linking relationships are represented by the nodes 51 and the edges 52 can be divided into a plurality of clusters by the computer through use of a predetermined algorithm.

As examples of the algorithm for performing the cluster division on a network represented by a graph (plant model in this example), there can be given a Girvan-Newman algorithm that does not use an evaluation function (for example, modularity described later) and a Newman algorithm that uses an evaluation function.

In each of FIG. 4A to FIG. 4D, there is illustrated a method for the cluster division using the Girvan-Newman algorithm.

In the Girvan-Newman algorithm, the shortest path is specified for all the pairs of nodes 51 included in the network, and the edges 52 in the shortest path are counted. In a pair of nodes 51 indicated by hatching in FIG. 4A, the edges 52 indicated by a thick line form the shortest path. Then, a count value "+1" is assigned to each of the edges 52 (step of assigning a count value). Meanwhile, two shortest paths are present in a pair of nodes 51 indicated by hatching in FIG. 4B. In this case, a value "+0.5" obtained by dividing the normal count value by the number of the shortest paths is a count value of each of the edges 52.

In this manner, the same processing is performed on all the pairs of nodes 51 included in the network, and the count values of the respective edges 52 are added.

Figure 4A:
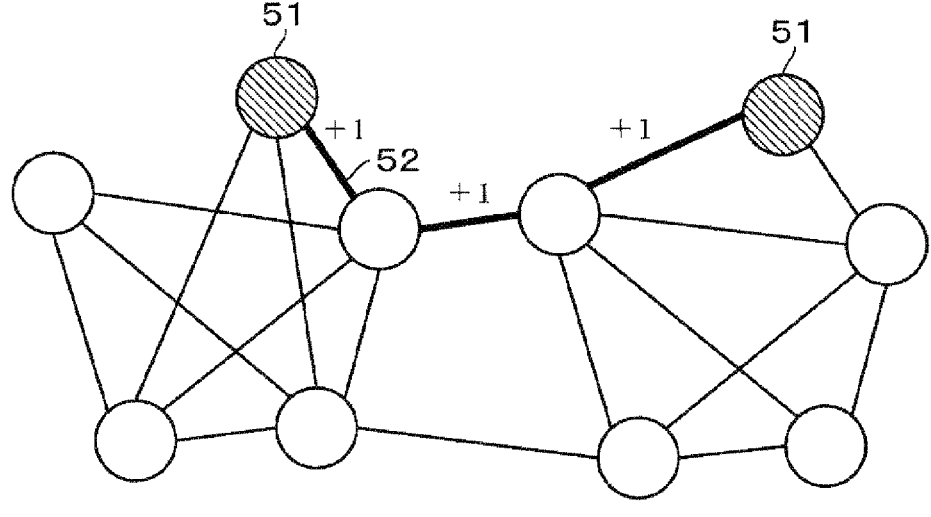
FIG. 4A is a first explanatory diagram regarding clustering.
Figure 4B:
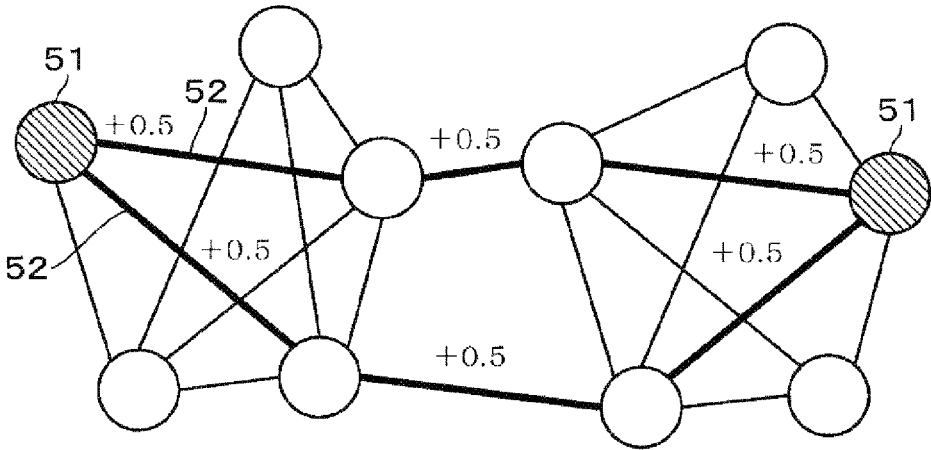
FIG. 4B is a second explanatory diagram regarding clustering.
Figure 4C:
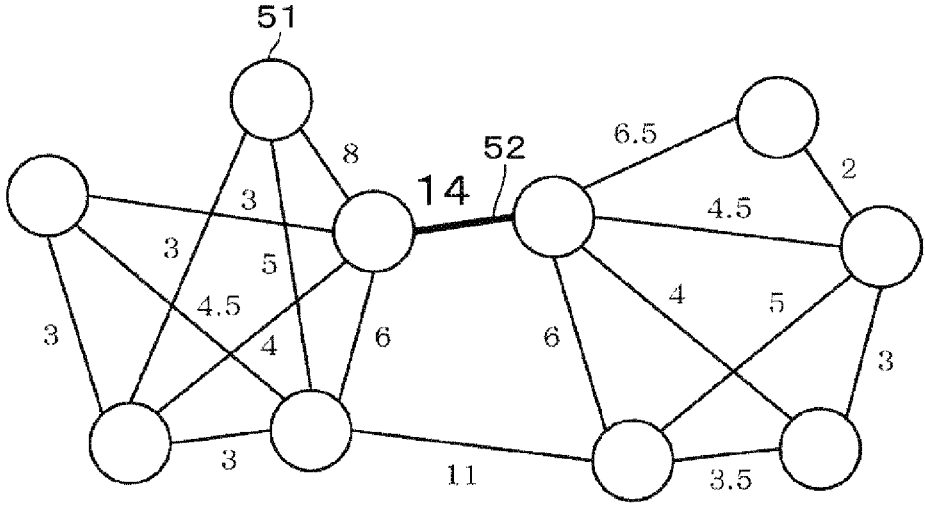
FIG. 4C is a third explanatory diagram regarding clustering.

As a result, it is assumed that the count values of the respective edges 52 forming the network become those illustrated in FIG. 4C. In this case, the same processing as in the example described with reference to FIG. 4A and FIG.

6

Figure 4D:
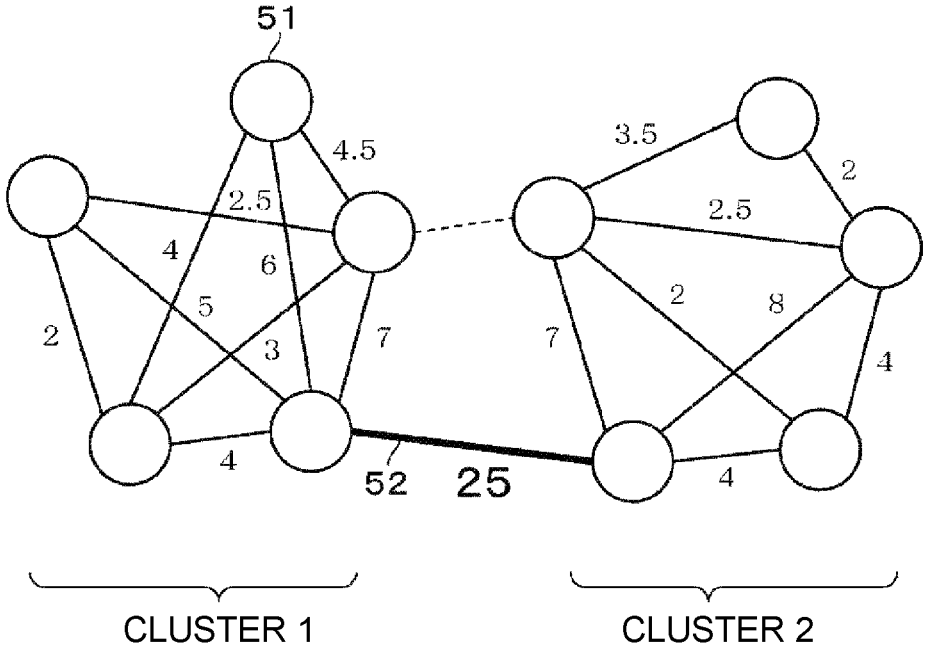
FIG. 4D is a fourth explanatory diagram regarding clustering.

4B is performed on a new network obtained by cutting the edge 52 indicated by the thick line having the largest count value (FIG. 4D).

The numerical values assigned to each of FIG. 4C and FIG. 4D are described imaginarily for convenience of description, and are not values obtained by actually performing the Girvan-Newman algorithm.

When the edge 52 indicated by the thick line having the largest count value is cut in the network illustrated in FIG. 4D, two clusters of clusters 1 and 2 are obtained. In other words, the processing described with reference to FIG. 4A to FIG. 4D corresponds to the search for an edge between clusters.

In this example, the above-mentioned network corresponds to the plant model. After the plant model is divided into a plurality of clusters, the grouping is performed so that the devices 31 associated with the nodes 51 included in the common cluster are included in the common device group 3.

Modularity is known as an indicator for evaluating the results of the cluster division by an algorithm. The modularity is defined by the following expression.

[Math. 1]

$$Q = \sum_i \left( e_{ii} - \left( \sum_j e_{ij} \right)^2 \right) = \sum_i \left( e_{ii} - a_i^2 \right)$$

Here, when the edge 52 is not weighted, $e_{ii}$ is a proportion of the total value of the number of the edges 52 linked to each of the nodes 51 included in a cluster "i" with respect to the number of all the edges 52, and $e_{ij}$ is a proportion of the number of the edges 52 linking the cluster "i" and a cluster "j" to each other with respect to the number of all the edges 52. In addition, $a_i$ is a proportion of the number of the edges 52 linking the cluster "i" and another cluster to each other with respect to the number of all the edges 52.

In addition, when the edge 52 is weighted, the "number of the edges 52" in the above description is read as "weight of the edges 52."

The value of modularity Q changes between 0 and 1. When the value is closer to 1, it is evaluated that the satisfactory cluster division has been performed. Here, the "satisfactory cluster division" refers to a state in which the cluster division has been performed so that the number of the edges 52 that connect the nodes 51 belonging to the same cluster to each other is large, and the number of the edges 52 that connect the nodes 51 belonging to different clusters to each other is small.

The Girvan-Newman algorithm described above is not a method for performing the cluster division by directly using the modularity Q in an evaluation function. Meanwhile, the modularity Q is an indicator proposed in order to quantitatively evaluate the validity of the cluster division by the Girvan-Newman algorithm. Then, when the cluster division is performed based on the Girvan-Newman algorithm, the search for the edge 52 between the clusters in which the modularity Q is further increased is performed.

In addition, the Newman algorithm is a method for performing the cluster division while gradually enlarging clusters from one node by using the modularity Q in the evaluation function as a change amount of the evaluation function. The above-mentioned plant model can be subjected to the cluster division even when the Newman algorithm is used.

As described above, there have been proposed various methods for performing the cluster division on a network represented by a graph, as well as the Girvan-Newman algorithm. Meanwhile, there has not hitherto been an idea of performing the cluster division on a plant model in which the processing plant 1 for processing a fluid is represented by a graph and using the cluster division for the grouping of the devices 31 forming the processing plant 1.

In this case, in creation of a plant model, it is preferred that the features peculiar to the processing plant 1 be able to be represented by a graph. Now, individual features and representation methods therefor are exemplified with reference to FIG. 5 to FIG. 7.

Figure 5:
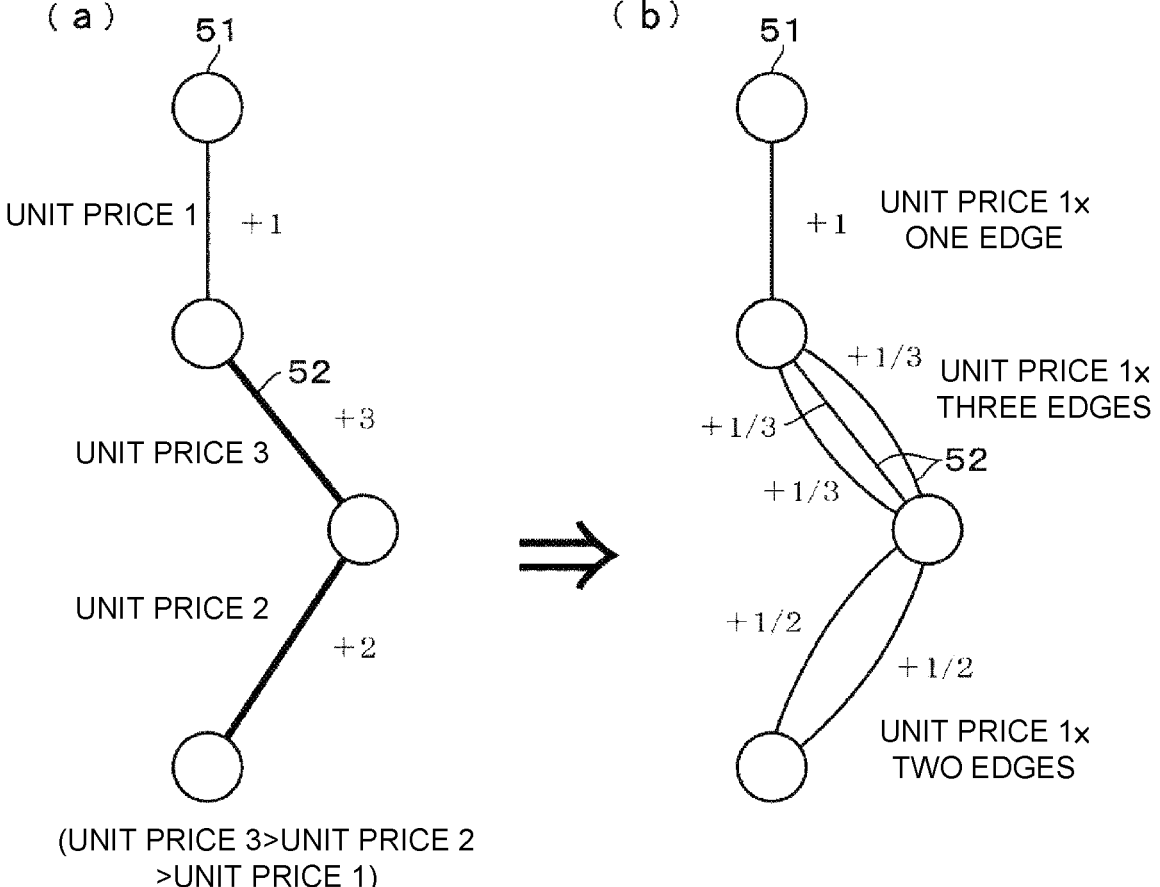
FIG. 5 shows configuration examples of a plant model in which cost per unit length of each pipe is reflected.

FIG. 5 shows creation examples of a plant model in consideration of the cost of the pipe 4.

In the processing plant 1, the pipes 4 connecting the devices 31 to each other have various different combinations of a pipe diameter, a thickness, and a pipe material, and those differences are reflected on the cost per unit length of each of the pipes 4.

In this case, when the pipe 4 having high cost per unit length becomes a boundary, and the devices 31 connected to the pipe 4 are divided into the separate device groups 3, there is a risk in that the pipe length of the pipe 4 having high cost may be increased.

In view of the foregoing, as illustrated in Part (a) of FIG. 5, it may be possible to create a plant model in which, when the pipe 4 has higher cost per unit length, the corresponding edge 52 is weighted with a larger weight. In Part (a) of FIG. 5, "unit prices 1 to 3" indicate the relative magnitude of the costs per unit length of the pipes 4.

In the plant model illustrated in Part (a) of FIG. 5, the clustering is performed through use of an algorithm in which the weighted edge 52 can be handled, and an edge having a smaller weight is easily selected as the edge 52 between clusters. With this clustering, the devices 31 connected to the pipe 4 having high cost per unit length can be prevented from being easily divided into the different device groups 3. As examples of such algorithm, there can be given spectral clustering and the like.

Contrary to the above-mentioned example, the adoption of a method for performing the clustering through use of an algorithm in which a value that is in inverse proportion to the cost per unit length is set as a weight to be assigned to the edge 52, and an edge having a larger weight is easily selected as the edge 52 between clusters is not denied.

In addition, when the above-mentioned Girvan-Newman algorithm is used, as illustrated in Part (b) of FIG. 5, it may be possible to create a plant model in which, in the pipe 4 having higher cost per unit length, the number of the edges 52 that link the nodes 51 corresponding to the devices 31, to which the pipe 4 is connected, to each other is increased.

In the plant model illustrated in Part (b) of FIG. 5, when the above-mentioned Girvan-Newman algorithm is used, a plurality of shortest paths corresponding to the pipe 4 having high cost per unit length are formed, and hence the count value of each of the edges 52 is decreased. As a result, the grouping in which the devices 31 connected to the pipe 4 having high cost per unit length are divided into the different device groups 3 can be prevented from being easily performed.

Figure 6:
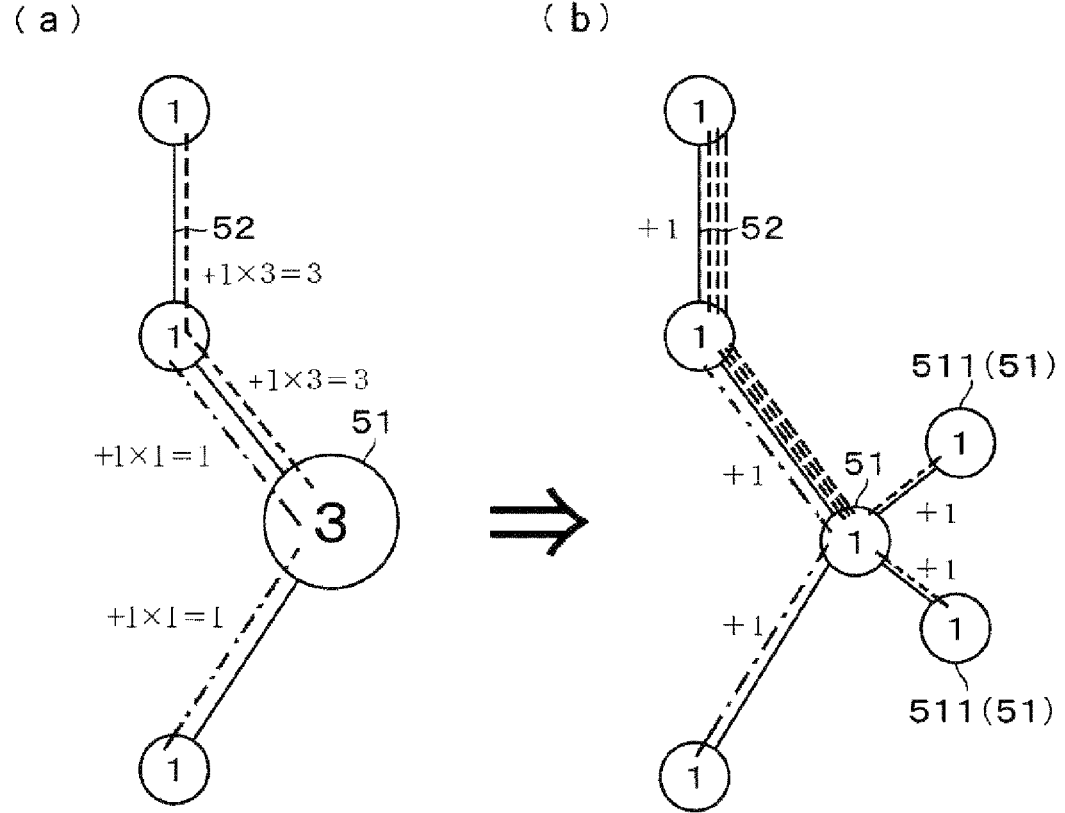
FIG. 6 shows configuration examples of a plant model in which an area of occupation and the like of each device are reflected.

Next, FIG. 6 shows creation examples of a plant model in consideration of an area of occupation and evaluation values of the device 31.

In the processing plant 1, the device 31 having a large area of occupation tends to cause the number of the other devices 31 that can be arranged in the partition region 30 to be decreased. In addition, even when the area of occupation is not large, the other devices 31 may not be arranged in a large number in the partition region 30 in which a device 31 is arranged from the viewpoint of securement of a safe distance, a weight limit, and the like.

In view of the foregoing, as illustrated in Part (a) of FIG. 6, it may be possible to create a plant model in which the device 31 having a larger area of occupation is weighted with a larger weight or the device 31 having higher evaluation values (indicator for reducing the number of the devices 31 included in the common device group 3, as well as the above-mentioned securement of a safety distance and weight limit) set in advance is weighted with a larger weight. In Part (a) of FIG. 6, the numerical values "1 and 3" assigned to the inside of the devices 31 indicate the weights assigned in accordance with the areas of occupation and evaluation values of the devices 31.

In this case, the edge 52 in the shortest path of the pair including the node 51 assigned with a larger weight is evaluated so that the weight of the edge 52 is further increased. When focus is given on the pair of nodes 51 in which the shortest path is accompanied by a broken line in the example illustrated in Part (a) of FIG. 6, the nodes 51 are assigned with weights of "1" and "3", respectively. Thus, each of the edges 52 included in the shortest path is assigned with a weight of "1×3=+3", and the weight is counted as a count value.

Meanwhile, when focus is given on the pair of nodes 51 in which the shortest path is accompanied by an alternate long and short dash line in Part (a) of FIG. 6, each of the nodes 51 is assigned with a weight of "1". Thus, each of the edges 52 included in the shortest path is assigned with a weight of "1×1=+1", and the weight is counted as a count value.

With the plant model illustrated in Part (a) of FIG. 6, there is used an algorithm in which the weighted nodes 51 can be handled, and an edge having a larger weight is easily selected as the edge 52 between clusters. As a result, the other devices 31 can be prevented from being easily grouped into the device group 3 common to the device 31 having a large area of occupation or the device 31 having high evaluation values.

In addition, when the above-mentioned Girvan-Newman algorithm is used, as illustrated in Part (b) of FIG. 6, it may be possible to create a plant model in which the device 31 having a larger area of occupation or the device 31 having higher evaluation values is represented by increasing the number of connections of dummy nodes 511 each being the node 51 which is linked to one node 51 corresponding to the device 31 via one edge 52 and which is not linked to the nodes 51 other than the one node 51.

With the plant model illustrated in Part (b) of FIG. 6, when the above-mentioned Girvan-Newman algorithm is used, the edges 52 in the shortest path accompanied by a broken line in Part (b) of FIG. 6 include those which are redundantly counted a plurality of times in accordance with the provided number of the dummy nodes 511. Meanwhile, the edges 52 in the shortest path accompanied by an alternate long and short dash line in Part (b) of FIG. 6 are not influenced by the dummy nodes 511, and redundant counting is not performed.

When the Girvan-Newman algorithm is performed based on the above-mentioned configuration, the count value of the edge 52 of the shortest path including the device group 3 having a large area of occupation or the device group 3 having high evaluation values is increased. As a result, the other devices 31 can be prevented from being easily included in the device group 3 common to the device 31 having a large area of occupation or the device 31 having high evaluation values. According to the above-mentioned method, the variation in area of the partition region 30 of each of the device groups 3 or total evaluation values of the devices 31 included in the device group 3 can be reduced.

Figure 7:
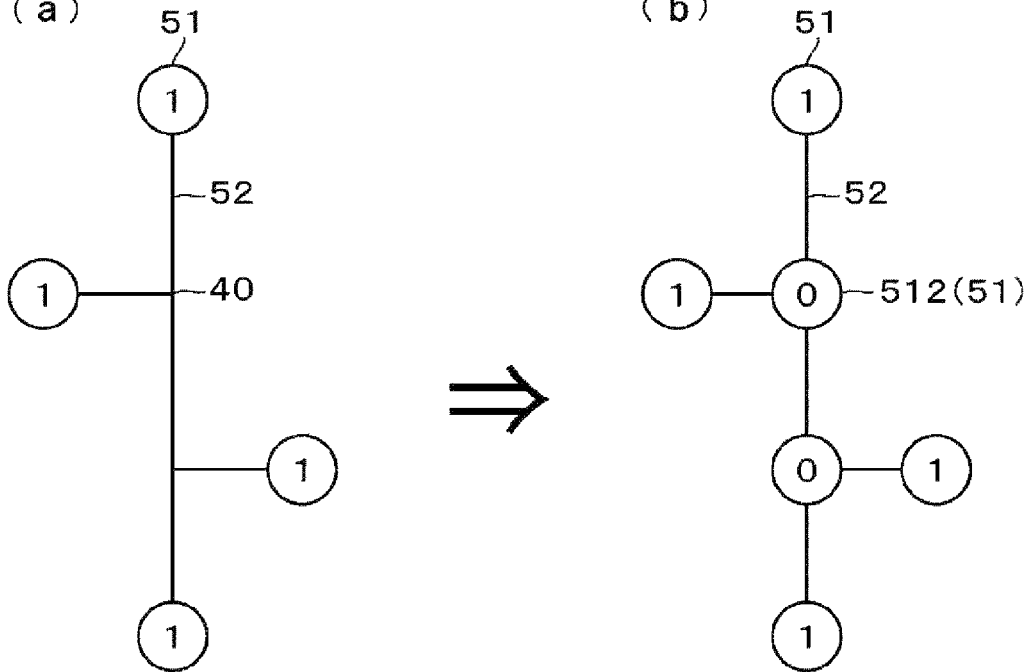
FIG. 7 shows configuration examples of a plant model in which branching of the pipe is reflected.

Next, FIG. 7 shows creation examples of a plant model in which branching of the pipe 4 is represented. As illustrated in FIG. 2 described above and Part (a) of FIG. 7, some of the pipes 4 provided in the processing plant 1 are branched into two or more pipes 4 via the branch point 40. Meanwhile, the presentation that the edge 52 is branched is not used in a general graph representing a network.

In view of the foregoing, as illustrated in Part (b) of FIG. 7, it may be possible to create a plant model in which the branch node 512 is provided so as to correspond to the branch point 40, and the branch node 512 and the node 51 corresponding to the device 31 connected via the branched pipe 4 are liked to each other via the edge 52, to thereby represent the branched 40 pipe 4.

In this case, it is assumed that the algorithm for performing the cluster division includes a method for counting the edges included in the shortest path, as in the Girvan-Newman algorithm described with reference to FIG. 4A and FIG. 4B. At this time, the branch node 512 is handled so as not to be selected as the two nodes 51 forming the shortest path.

With the plant model illustrated in Part (b) of FIG. 7, the branch point 40 of the pipe 4, which is difficult to be represented by a conventional graph, can be represented.

As described above, the plant model corresponding to the processing plant 1 is created based on the method described with reference to FIG. 3 and FIG. 5 to FIG. 7 (step of creating a plant model). Here, before the cluster division of the created plant model is performed, a cluster division condition is set (step of setting a cluster division condition). The cluster division condition is a constraint condition which is set when the clustering of the plant model is performed by a computer.

As the cluster division condition, at least one of the number of clusters into which the cluster division is to be performed or a range of a grain size that is an addition value of a weight set to each of the nodes included in each of the clusters is set.

The number of clusters is a constraint condition for setting the number of divisions of the plant model. When the number of clusters is set as the cluster division condition, the clusters are formed in the set number, and the processing of searching for an edge between clusters is performed so that the modularity Q is further increased.

The grain size is a constraint condition which is set to the cluster, for example, so that the characteristics of the device group 3, such as the number of the devices 31 included in each of the device groups 3 and the total area of occupation of the devices 31 included in each of the device groups 3, are adjusted to values within a predetermined range.

The grain size can be calculated by adding weights that are set in advance to the nodes 51 included in each of the clusters. For example, when the number of the devices 31 included in the device group 3 is adjusted to a number within a predetermined range, the weight "1" is set to each of the nodes 51. Meanwhile, when the total area of occupation of the devices 31 included in each of the device groups 3 is adjusted to a value within a predetermined range, a weight in accordance with the area of occupation of the corresponding device 31 is set to each of the nodes 51. Those weights may be set when the plant model is created, as illustrated in Part (a) of FIG. 6 and Part (b) of FIG. 7. Although the search results may not be easily obtained, both the number of clusters into which the cluster division is to be performed and the range of the grain size of the clusters may also be set as the cluster division condition.

After the creation of the plant model and completion of setting of the cluster division condition, the cluster division of the plant model is performed through use of a computer (step of performing cluster division). For example, in Example described later, the cluster division of a plant model was performed through use of a specially developed tool. In addition, the step may be performed through use of, for example, programs of the Girvan-Newman method and other clustering algorithms provided in NetworkX, which is a library of Python (US registered trademark of the Python Software Foundation).

As a result, the cluster division of the plant model illustrated in FIG. 3 is performed. Based on the results of this cluster division, for example, as illustrated in FIG. 8, each of the devices 31 forming the processing plant 1 can be grouped into a plurality of device groups 3.

Figure 8:
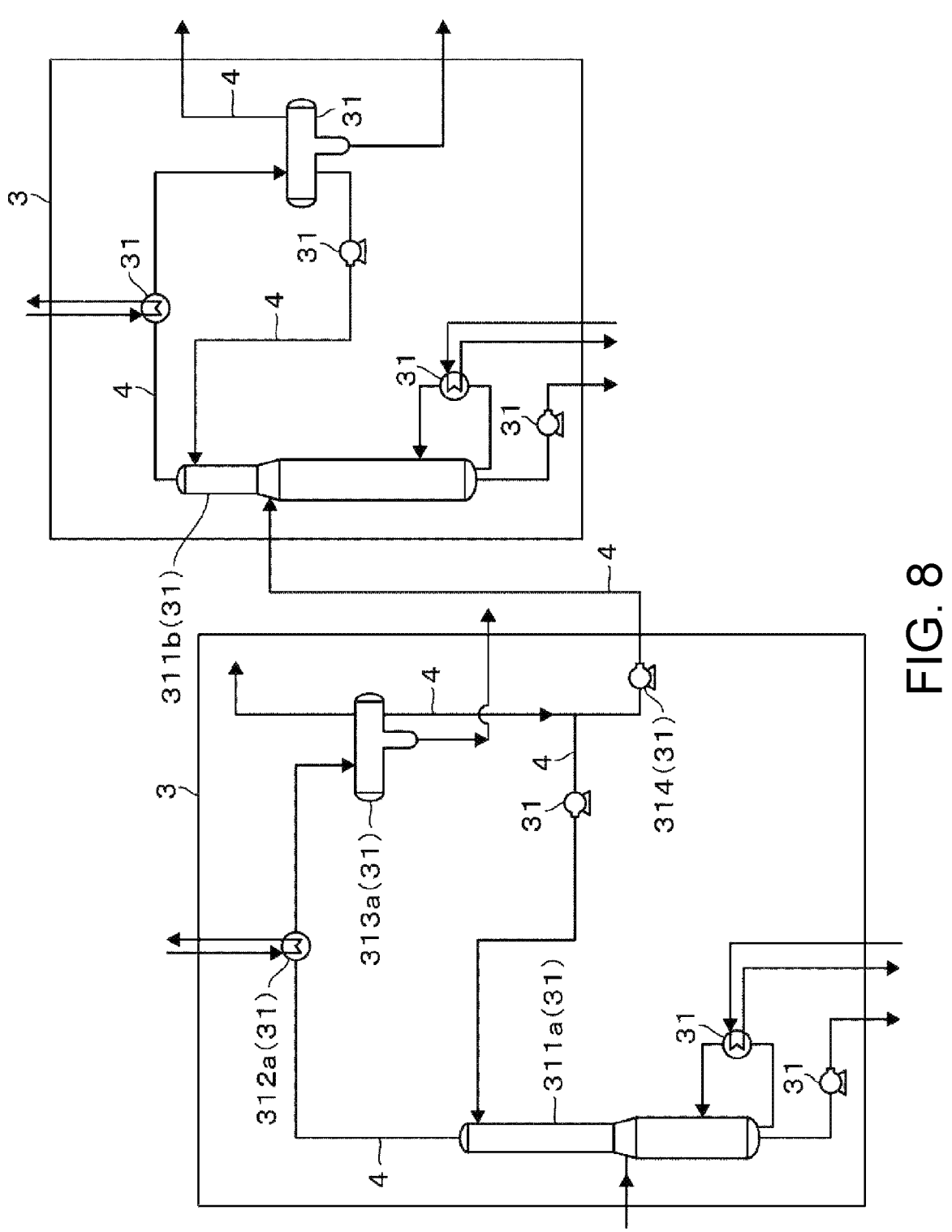
FIG. 8 shows an example of a process in which grouping has been performed based on the results of clustering.

In FIG. 8, there are illustrated the results obtained by grouping the devices 31 included in a part of a process flow of the processing plant 1. However, in actuality, the grouping into the device groups 3 may be performed based on the results obtained by creating a plant model of the entire processing plant 1, followed by the cluster division.

As a result, as schematically illustrated in FIG. 1, for example, all the devices 31 forming the processing plant 1 are grouped. Based on the results of this grouping, the investigation on the arrangement of the devices 31 in the device group 3 (partition region 30) and the arrangement position of the device group 3 in the plot 10 can be conducted. As a result, for example, through adjustment of the arrangement position of the device group 3 in the plot 10, arrangement in which the total use amount (total cost) of the pipes 4 is small can also be searched for.

The clustering method according to this embodiment has the following effects. A plant model in which the devices 31 and the pipes 4 of the processing plant 1 are represented by a graph formed of the nodes 51 and the edges 52 is created, and cluster division of the plant model is searched for so that the modularity is increased under the condition set in advance. As a result, quantitative evaluation based on the evaluation criteria (modularity) can be performed, and the grouping of the devices 31 forming the processing plant 1 can be rationally performed.

Here, the grouping of the devices 31 is not required to be completely matched with the results of the cluster division of the plant model. The results of the cluster division are checked from the viewpoint of engineers involved in the design and construction of the processing plant 1, and regarding the device 31 included in the device group 3 that is not matched with the actual situation or the device 31 that should be included in another device group 3, the device group 3 in which the device 31 of interest is included may be changed.

EXAMPLE (Simulation)
A. Simulation Condition

As an example of the processing plant 1, a plant model was created from a PFD regarding a natural gas liquefaction plant (LNG plant) in which design and arrangement of the devices 31 have been completed. After that, the number of clusters was set to "7" as a cluster division condition, and the cluster division of the plant model was performed by the Girvan-Newman algorithm through use of a specially developed tool.

The number of the devices 31 forming the LNG plant (number of the nodes 51 in the plant model) is 87. In addition, various adjustments of the plant model described with reference to Parts (a) and (b) of FIG. 5, Parts (a) and (b) of FIG. 6, and Parts (a) and (b) of FIG. 7 were not performed.

B. Simulation Results

Figure 9:
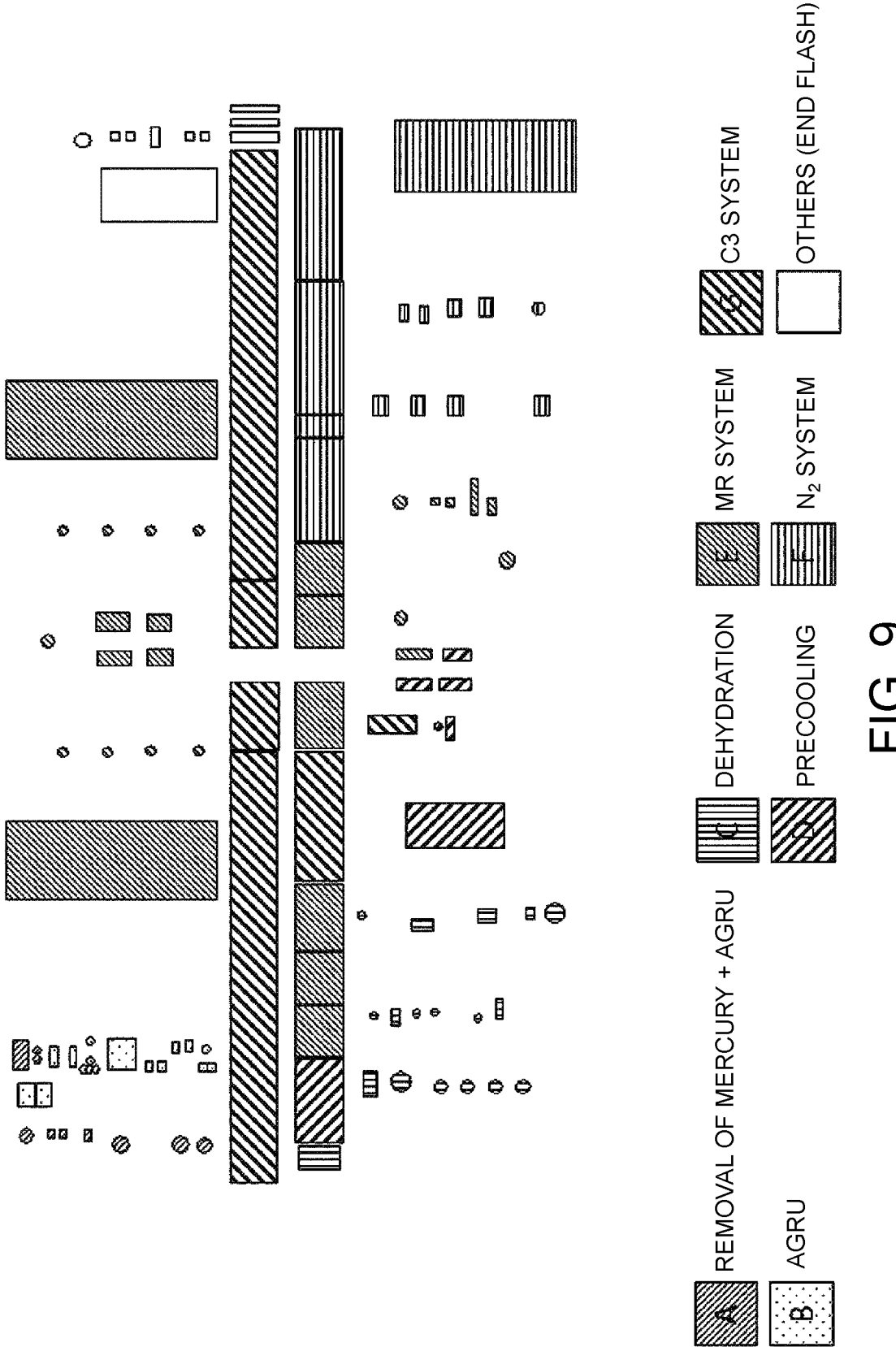
FIG. 9 shows an example of device arrangement of an LNG plant.
Figure 10:
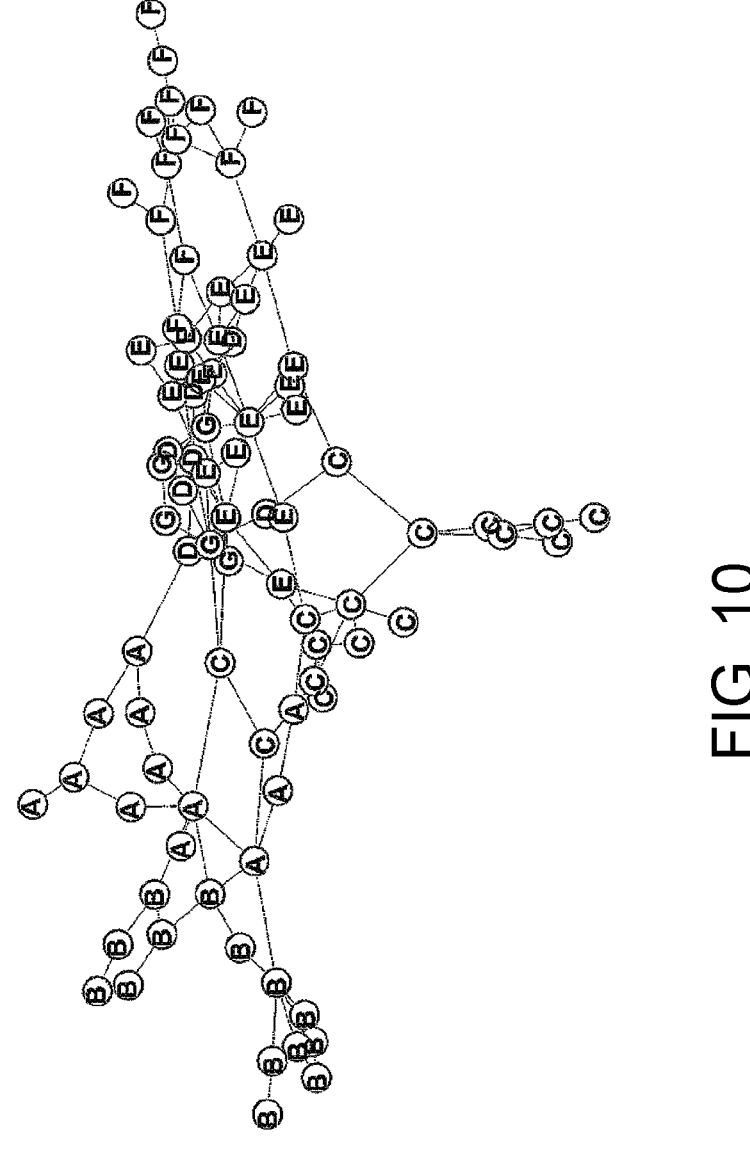
FIG. 10 shows an example of a clustered plant model.

In FIG. 9, there is illustrated arrangement positions of the devices 31 forming the LNG plant, which is the basis of the plant model, in the partition region 30. In addition, in FIG. 10, there is illustrated a process model in which the cluster division has been performed. In FIG. 10, devices of "OTHERS" in FIG. 9 are not included.

When the plant model of FIG. 10 was subjected to the cluster division, the plant model was divided into clusters identified by reference symbols A to G assigned in FIG. 10. In FIG. 9, the devices 31 are grouped based on the results of this cluster division, and common hatching is given to the devices 31 included in each of the device groups 3.

As described in legends of hatching in FIG. 9, the cluster division was performed so that a cluster denoted with reference symbol A includes a device related to mercury removal treatment and a part of devices of an acid gas recovery unit (AGRU) for acid gas removal treatment, and a cluster denoted with reference symbol B includes the remaining devices of the AGRU. In addition, refrigerant systems of a mixed refrigerant (MR), a C3 (propane) refrigerant, and a nitrogen ($N_2$) refrigerant were subjected to the cluster division into different clusters (reference symbols E, G, and F), respectively. Also in the other clusters, the cluster division in accordance with the content of the processing to be performed in the LNG plant was performed.

The plant model illustrated in FIG. 10 is not given any information on the function of each of the devices 31 or the content of the processing of natural gas. Nevertheless, natural grouping in accordance with the kind of the process included in the LNG plant and the functions of the devices 31 was successfully performed only based on the information on the connection relationship between the devices 31 via the pipes 4.

The invention claimed is:

1. A clustering method, comprising the steps of:
creating a plant model in which connection relationships between a plurality of devices for constructing a processing plant configured to process a fluid and pipes connecting the plurality of devices to each other are represented by a graph showing a linking relationship between a node corresponding to each of the plurality of devices and an edge corresponding to each of the pipes;
setting, regarding the plant model, a cluster division condition which is at least one of the number of clusters into which cluster division is to be performed and a range of a grain size that is an addition value of a weight set to each of the nodes comprised in each of the clusters; and
performing, by a computer, the cluster division of the plant model by searching for an edge between the clusters in which modularity is further increased while the cluster division condition is satisfied.

2. The clustering method according to claim 1, wherein the step of creating the plant model comprises creating the plant model in which, when cost per unit length of the corresponding pipe is higher, the edge is weighted with a larger weight.

3. The clustering method according to claim 1, wherein the step of creating the plant model comprises creating the plant model in which, when an area of occupation of the corresponding device is larger or when evaluation values set in advance to the device are higher, the node is weighted with a larger weight.

4. The clustering method according to claim 1, wherein the step of performing the cluster division is performed based on a Girvan-Newman algorithm.

5. The clustering method according to claim 4, wherein the step of creating the plant model comprises creating the plant model in which, when cost per unit length of the pipe is higher, the number of unweighted edges that link two nodes corresponding to two devices, to which the pipe is connected, to each other is increased.

6. The clustering method according to claim 4,
wherein the nodes corresponding to the plurality of devices comprised in the plant model are unweighted nodes, and
wherein the step of creating the plant model comprises creating the plant model in which, when an area of occupation of the device is larger or when evaluation values set in advance to the device are higher, the number of connections of dummy nodes is increased, the dummy nodes each being a node which is linked to one node corresponding to the device via one edge and which is prevented from being linked to the nodes other than the one node.

7. The clustering method according to claim 1,
wherein the step of performing the cluster division comprises the step of assigning a count value to each of edges in a shortest path between two nodes comprised in the plant model by counting the edges, and
wherein, when the processing plant comprises a pipe branched at a branch point, the step of creating the plant model comprises creating the plant model in which a branch node prevented from being selected as the two nodes when the step of assigning the count value is performed is provided so as to correspond to the branch point, and the branch node and a node corresponding to the device connected via the branched pipe are linked to each other via an edge to represent the branched pipe.

* * * * *